(12) United States Patent
Nishikiori et al.

(10) Patent No.: US 7,907,502 B2
(45) Date of Patent: Mar. 15, 2011

(54) OPTICAL INFORMATION RECORDING MEDIUM, ITS INFORMATION RECORDING/REPRODUCING METHOD, AND INFORMATION RECORDING/REPRODUCING DEVICE

(75) Inventors: Keiji Nishikiori, Kyoto (JP); Morio Tomiyama, Nara (JP); Eiji Ohno, Osaka (JP)

(73) Assignee: Panasonic Corporation, Osaka (JP)

( * ) Notice: Subject to any disclaimer, the term of this patent is extended or adjusted under 35 U.S.C. 154(b) by 995 days.

(21) Appl. No.: 11/577,746

(22) PCT Filed: Nov. 8, 2005

(86) PCT No.: PCT/JP2005/020458
§ 371 (c)(1),
(2), (4) Date: Apr. 23, 2007

(87) PCT Pub. No.: WO2006/049301
PCT Pub. Date: May 11, 2006

(65) Prior Publication Data
US 2008/0043602 A1 Feb. 21, 2008

(30) Foreign Application Priority Data
Nov. 8, 2004 (JP) .................. 2004-323351

(51) Int. Cl.
*G11B 7/24* (2006.01)
(52) U.S. Cl. ....................... 369/275.4; 369/94
(58) Field of Classification Search ...... 369/47.2–47.22, 369/47.36, 47.38, 47.4–47.41, 47.46–47.48, 369/53.2–53.23, 53.29, 59.23–59.27, 94, 369/275.1–275.5
See application file for complete search history.

(56) References Cited

U.S. PATENT DOCUMENTS 5,148,422 A  9/1992 Sako et al.
(Continued)

FOREIGN PATENT DOCUMENTS

| EP | 0 910 072 A2 | 4/1999 |
|----|----|----|
| EP | 1 526 521 A2 | 4/2005 |
| JP | 3-83234 | 4/1991 |

(Continued)

OTHER PUBLICATIONS

Japanese Office Action from the correspondence JP No. 2006-542469. mailed Aug. 24, 2010.

*Primary Examiner* — Thang V Tran
*Assistant Examiner* — Nathan A Danielsen
(74) *Attorney, Agent, or Firm* — Hamre, Schumann, Mueller & Larson, P.C.

(57) ABSTRACT

An optical information recording medium includes a substrate, n information recording layers provided on the substrate, and spacer layers, each of which is provided so as to be interposed between the information recording layers, wherein each of (n−1) or more of the information recording layers has a layer number information part that is formed in correspondence with one or more recording marks X and contains layer number information, where n represents an integer of not less than 2, and the layer number information is information used for determining which a given information recording layer is among the n information recording layers. Each recording mark X has a length in a circumferential direction longer than a length of a recording mark Y used for recording another information in the information recording layers.

6 Claims, 13 Drawing Sheets

U.S. PATENT DOCUMENTS

| | | |
|---|---|---|
| 5,846,626 A | 12/1998 | Kashiwagi et al. |
| 2002/0021656 A1 | 2/2002 | Tsukagoshi et al. |
| 2002/0031063 A1 | 3/2002 | Kojima |
| 2002/0060978 A1 | 5/2002 | Hirotsune et al. |
| 2003/0058771 A1* | 3/2003 | Furukawa et al. .......... 369/59.11 |
| 2004/0013067 A1* | 1/2004 | Lee et al. .................... 369/53.22 |
| 2004/0152016 A1* | 8/2004 | Mishima et al. .............. 369/284 |
| 2005/0041555 A1* | 2/2005 | Ogawa et al. ................... 369/94 |

FOREIGN PATENT DOCUMENTS

| | | |
|---|---|---|
| JP | 8-235638 | 9/1996 |
| JP | 10-283683 | 10/1998 |
| JP | 2002-50053 A | 2/2002 |
| JP | 2002-279647 | 9/2002 |
| JP | 2004-185664 | 7/2004 |
| JP | 2005-327327 | 11/2005 |

* cited by examiner

PRIOR ART

OPTICAL INFORMATION RECORDING MEDIUM, ITS INFORMATION RECORDING/REPRODUCING METHOD, AND INFORMATION RECORDING/REPRODUCING DEVICE

TECHNICAL FIELD

The present invention relates to an optical information recording medium and a method for recording/reproducing the same, and an information recording/reproducing device.

BACKGROUND ART

In recent years, in the field of information recording, studies on various types of optical information recording media have been carried out. Optical information recording media are being applied to a wide variety of applications as a medium on which high-density recording can be carried out, to and from which information can be recorded and reproduced in a non-contact mode, and which can be provided at a low cost.

Furthermore, in recent years, in order to achieve high-density recording, an optical disk on which information recording and/or reproducing operations can be carried out by an information recording/reproducing device that is provided with a light source that emits laser light with a wavelength of, for example, about 400 nm, and an optical head including an objective lens having a large numerical aperture (NA), for example, 0.85, is proposed as well (see Patent Documents 1 and 2 shown below).

The size of a recording mark formed on an optical disk is proportional to the size of a light spot, and by reducing the size of a light spot, the recording density can be improved. The size of a light spot is determined by $\lambda/NA$, where $\lambda$ denotes a wavelength of irradiating laser beams. That is to say, by increasing NA, high-density recording can be achieved.

In the case where the spot size is reduced by increasing NA, however, even a slight tilt of a disk leads to serious reproduction failure. To compensate this inconvenience, the foregoing optical disk is configured to have an increased tilt margin by thinning a light transmission layer arranged as an outermost layer on the laser incidence side to about 0.1 mm.

As a method for forming a thinner light transmission layer, there has been proposed a method of adhering a resin film formed by a casting method to the information recording layer with a UV curable adhesive or an acrylic adhesive.

FIG. 19 shows a configuration of a conventional optical information recording medium 10. The optical information recording medium 10 has a configuration in which an information recording layer 12 is placed on a substrate 11 having thereon projections and recesses for forming tracks, and a light transmission layer 14 formed with a resin film adheres to the information recording layer 12 with an adhesive layer 13 being interposed therebetween.

In the foregoing conventional optical information recording medium, for example, in each frame, address information and layer number information corresponding to the frame are recorded preliminarily. According to such information, alignment of the optical head is carried out accurately upon recording/reproduction, etc. (see Patent Document 3 shown below).

Patent Document 1: JP 8(1996)-235638 A
Patent Document 2: JP 10(1998)-283683 A
Patent Document 3: JP 3(1991)-83234 A

DISCLOSURE OF INVENTION

Problem to be Solved by the Invention

However, for reading out the foregoing layer number information and the like, both of a focusing operation and a tracking operation are required. Therefore, the conventional optical information recording medium has the following drawbacks.

(1) A long time elapses from the setting of an optical information recording medium in an information recording/reproducing device until the start of recording and/or reproducing of information.

(2) When a focus position and/or a tracking position deviates from a desired position, it takes time to carry out repositioning.

(3) In the case where laser light cannot be focused on a desired information recording layer, the positioning of a focus position and a tracking position has to be carried out anew with respect to another information recording layer. Such a layer detection operation takes time.

These drawbacks lead to a problem such that, when a user wants to reproducing desired information, it takes time to detect an information recording layer in which the foregoing information is recorded. This problem becomes more serious as information recording layers increase in number.

Then, this problem relates not exclusively to the foregoing optical disk to/from which information is recorded and/or reproduced using laser light with a wavelength of about 400 nm, for example, but commonly to optical information recording media configured to have a plurality of information recording layers in each.

The present invention is proposed in light of the foregoing problems of the conventional configurations, and it is an object of the present invention to provide an optical information recording medium that is configured so that layer number information can be more quickly readable, whereby information recording/reproduction with respect to a desired information recording layer can be started more quickly. It is also an object of the present invention to provide a method and a device for recording/reproducing information to/from the foregoing optical information recording/reproducing medium.

Means for Solving Problem

An optical information recording medium of the present invention includes: a substrate; n information recording layers provided on the substrate; and spacer layers, each of which is provided so as to be interposed between the information recording layers. In the optical information recording medium, each of (n−1) or more of the information recording layers has a layer number information part containing layer number information, the layer number information part being formed in correspondence with one or more recording marks X, where n represents an integer of not less than 2, and the layer number information is information used for determining which a given information recording layer is among the n information recording layers. Each recording mark X has a length in a circumferential direction longer than a length of a recording mark Y used for recording another information in the information recording layers.

An information recording/reproducing device of the present invention is a device for carrying out recording/reproduction of information to/from the optical information recording medium of the present invention, and includes: an optical head that includes a light source emitting laser light, a focusing unit, and a tracking unit, and is capable of reading the layer number information from the layer number information parts in the given information recording layer of the optical information recording medium; a signal demodulator for demodulating layer number information read by the optical head; and an overall controller for determining the layer number information demodulated.

An information recording/reproducing method of the present invention is a method for carrying out recording/ reproduction of information to/from the optical information recording medium of the present invention by using the information recording/reproducing device of the present invention, and includes: a first step of determining the layer number information of the given information recording layer of the optical information recording medium; and a second step of recording/reproducing information to/from the given information recording layer after the first step. In this method, in the first step: the optical head is positioned above a given region including the layer number information part of the given information recording layer; the given region is irradiated with the laser light subjected to focusing control so that the layer number information is read by the optical head; the read layer number information is demodulated by the signal demodulator; the demodulated layer number information is determined by the overall controller; and tracking control is carried out with respect to the given information recording layer after the determination by the overall controller.

Another information recording/reproducing method of the present invention is a method for carrying out recording/ reproduction of information to/from the optical information recording medium of the present invention by using the information recording/reproducing device of the present invention, and the information recording/reproducing method includes: a first step of determining the layer number information of the given information recording layer of the optical information recording medium; and a second step of recording/reproducing information to/from the given information recording layer after the first step. In this method, in the first step: the optical head is positioned above a given region including the layer number information part of the given information recording layer; the given region is irradiated with the laser light subjected to focusing control so that the layer number information is read by the optical head; the read layer number information is demodulated by the signal demodulator; it is determined whether or not the demodulated layer number information is layer number information of a desired information recording layer by the overall controller; and either one of the following sub-steps (a) or (b) is carried out according to the determination: (a) in the case where the layer number information thus demodulated is determined not to be the layer number information of the desired information recording layer, carrying out, with respect to an information recording layer different from the given information recording layer, the positioning of the optical head above the given region of the layer, the irradiation of the layer with the laser light subjected to focusing control, and the determination of the layer number information of the layer; and (b) in the case where the demodulated layer number information is determined to be the layer number information of the desired information recording layer, carrying out tracking control with respect to the given information recording layer.

EFFECTS OF THE INVENTION

The present invention makes it possible to read layer number information more quickly. Therefore, the present invention makes it possible to provide an optical information recording medium configured so that an information recording/reproducing operation with respect to a desired information recording layer can be started more quickly, as well as to provide a method and a device for recording/reproducing information to/from the foregoing optical information recording medium.

BRIEF DESCRIPTION OF REFERENCE NUMERALS

Figure 1:
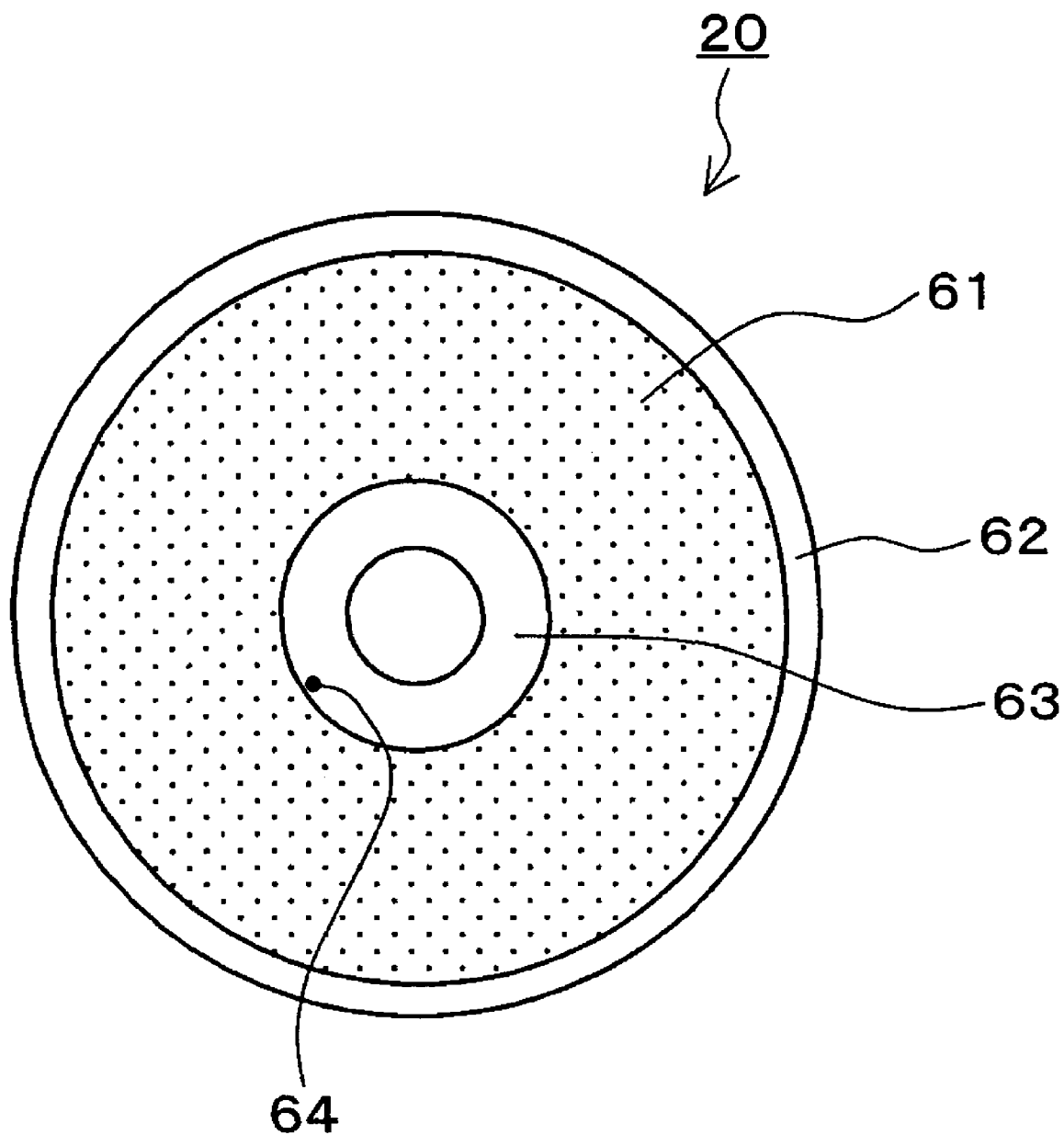
FIG. 1 is a conceptual diagram illustrating an exemplary optical information recording medium according to Embodiment 1.

10: optical information recording medium
11: substrate
12: information recording layer
13: adhesive layer
14: light transmission layer
20: optical information recording medium
21: substrate
22: first information recording layer
23: second information recording layer
24: third information recording layer
25: fourth information recording layer
26: light transmission layer
27: first spacer layer
28: second spacer layer
29: third spacer layer
61: data region
62: outer-radius external part
63: inner-radius external part
64: pit X (recording mark X)
71: a waveform of a reproduction signal obtained from a portion of a layer number information part corresponding to pit X
72: a waveform of a reproduction signal obtained from a portion other than layer number information part inside an inner-radius external part
81: a waveform of a reproduction signal obtained from a portion of a layer number information part corresponding to pit X
82: a waveform of a reproduction signal obtained from a pit Y
111: data region
112: inner-radius external part
113: pit X
121: data region
122: inner-radius external part
123: groove
131: data region
132: pit X
141: data region
142: groove
151: data region
152: internal mirror surface part
153: groove
161: data region
162: inner-radius external part
163a: pit X
163b: groove
90: information recording/reproducing device
91: optical disk
92: rotation motor
93: optical head
94: moving mechanism
95: focusing/tracking driver
96: moving driver
97: control unit
98: laser driver
99: laser power control unit
100: overall controller
101: signal demodulator
102: feedback circuit

DESCRIPTION OF THE INVENTION

In the exemplary optical information recording medium of the present invention, recording marks X are formed on a substrate or spacer layers provided adjacent to respective information recording layers. Each recording mark X is, for example, a groove or a pit, and one or more recording marks X may include at least either grooves or pits.

In the exemplary optical information recording medium of the present invention, one or more recording marks X form a recording mark X row (e.g. pit X row) including a plurality of recording marks X. In correspondence with the foregoing recording mark X row, one layer number information part is formed in an adjacent information recording layer. The plurality of recording marks X are formed, for example, in a circumferential direction of the substrate or the spacer layer.

In the exemplary optical information recording medium of the present invention, the recording mark X is formed with a groove whose lengthwise direction extends in the same direction as a radial direction of the optical information recording medium. At least one of n information recording layers preferably includes a plurality of layer number information parts that are identical to one another. In the case where the recording mark X corresponding to the layer number information part is the above-described groove, a plurality of grooves preferably are formed radially on the substrate or the spacer layer. In other words, it is preferable that a plurality of layer number information parts are formed radially in the information recording layer.

In the exemplary optical information recording medium of the present invention, at least one of the n information recording layers preferably includes a plurality of layer number information parts that are identical to one another, in a circle at a given radius. In such a case, layer number information can be read out when reproduction light passes over any one of the plurality of layer number information parts. Therefore, this configuration makes it possible to read layer number information more quickly, thereby further reducing the elapsed time till the start of information recording/reproduction.

In the exemplary optical information recording medium of the present invention, at least one of the n information recording layers includes at least one of the layer number information parts in each of two or more concentric circles at different radii. In this case, it is preferable that relatively more layer number information parts are provided in a circle at an outer radius than in a circle at an inner radius. This is because in the case where information is recorded/reproduced by rotating an optical information recording medium at a constant angular velocity, the configuration as above in which relatively more layer number information parts are provided in a circle at an outer radius than in a circle at an inner radius makes it possible to read out layer number information more quickly.

In the exemplary optical information recording medium of the present invention, at least two information recording layers selected from the n information recording layers are different from each other regarding at least one of the number of the layer number information parts, the positions where the layer number information parts are provided, and the form of the layer number information parts.

In the exemplary optical information recording medium of the present invention, it is preferable that the information recording layer is composed of a data region in which the recording marks Y are formed, and a non-data region outside the data region, and the layer number information parts are present in the non-data region. In this case, an optical information recording medium in which layer number information parts are provided can be provided without a decrease in data recording capacity. In the case where the layer number information parts are present in the non-data region, which is also called the mirror surface region, the reproduction quality of layer number information is enhanced.

In the exemplary optical information recording medium of the present invention, the layer number information part contains the layer number information of at least 2 bytes.

The exemplary information recording/reproducing device for recording/reproducing information to/from the optical information recording medium of the present invention preferably further includes a feedback circuit for controlling the focusing unit based on a result of determination by the overall controller so as to read layer number information of an information recording layer different from the given information recording layer. This is because in the case where many information recording layers are included in an optical information recording medium, feedback control works very effectively so as to reduce a time elapse until the start of information recording/reproducing to/from a desired information recording layer.

In the exemplary information recording/reproducing method using the information recording/reproducing device of the present invention, the reading of the layer number information by the optical head preferably is carried out with the same laser power as laser power used for reproducing information recorded in the information recording layer. This is because if the reproduction of layer number information is carried out with use of recording light subjected to focusing control, there is a possibility that information recorded in the data region would be erased by mistake.

The following describes embodiments of the present invention while referring to the drawings.

Embodiment 1

An exemplary optical information recording medium of the present invention is described in Embodiment 1. FIG. 1 is a plan conceptual diagram illustrating an exemplary optical information recording medium according to the present embodiment, and FIG. 2 is a cross-sectional view illustrating a data region of the optical information recording medium shown in FIG. 1.

Figure 2:
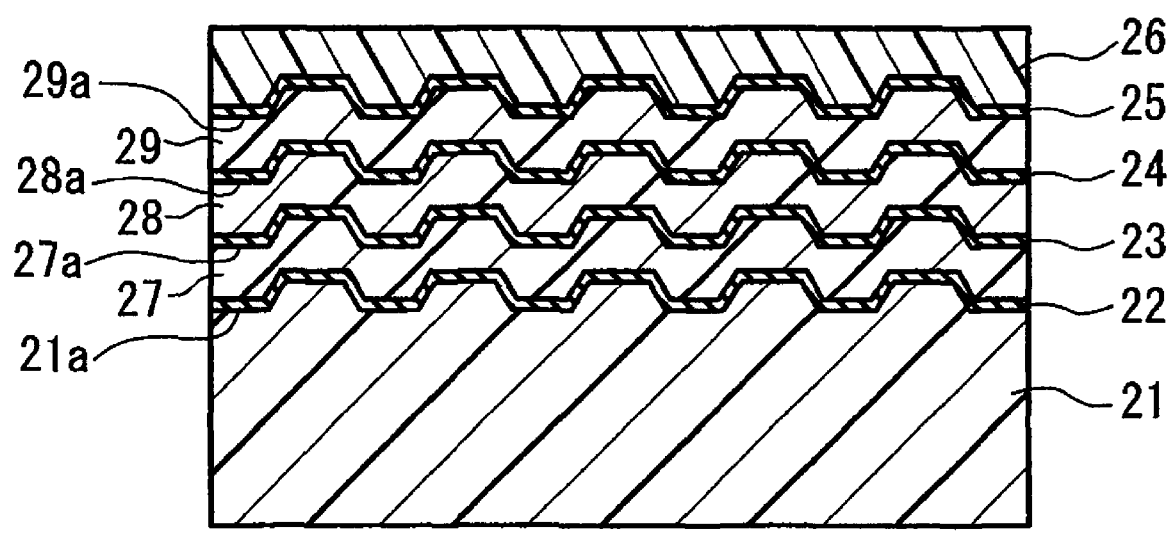
FIG. 2 is a cross-sectional view illustrating a data region of the optical information recording medium shown in FIG. 1

As shown in FIG. 2, the optical information recording medium according to the present embodiment has a configuration in which a first information recording layer 22, a first spacer layer 27, a second information recording layer 23, a second spacer layer 28, a third information recording layer 24, a third spacer layer 29, a fourth information recording layer 25, and a light transmission layer 26 are provided in the stated order on a substrate 21.

Principal surfaces of the substrate 21, the first spacer layer 27, the second spacer layer 28, and the third spacer layer 29 on one side are surfaces having projections and recesses, since guiding grooves for tracking are formed thereon. Hereinafter these surfaces having projections and recesses are referred to as L0 surface 21a, L1 surface 27a, L2 surface 28a, and L3 surface 29a, respectively, in some cases. Further, in some cases, the first to fourth information recording layers simply are referred to as information recording layers collectively, and the first to third spacer layers simply are referred to as spacer layers collectively.

As shown in FIGS. 1 and 2, the second information recording layer 23 has a layer number information part that is formed in correspondence with a pit X 64 (recording mark X). The pit X 64 is formed on the L1 surface 27a of the first spacer layer 27 adjacent to the second information recording layer 23 (not shown in FIG. 2), and the second information recording layer 23 formed on the L1 surface 27a by sputtering, vapor deposition, or another method also has a recess corresponding to the pit X 64, since the second information recording layer 23 is very thin. In the optical information recording medium of the present embodiment, the foregoing recess functions as the layer number information part containing layer number information.

Further, though not shown, recording marks X are formed on the L2 surface 28a and L3 surface 29a of the spacer layers adjacent to the third and fourth information recording layers 24 and 25, respectively. Therefore, each of the third and fourth information recording layers 24 and 25 adjacent to the L2 surface 28a and L3 surface 29a, respectively, also has layer number information parts.

Each information recording layer is composed of a data region 61 and a non-data region outside the data region 61. In the data region 61, a recording mark Y used for recording information different from layer number information is formed. The non-data region includes an outer radius part 62 outside the data region (hereinafter referred to as outer-radius external part 62), and an inner radius part 63 outside the data region (hereinafter referred to as inner-radius external part 63). In the example shown in FIG. 1, the pits X 64 are formed in a region immediately under the inner-radius external part 63, on the L1 surface 27a of the first spacer layer 27. Therefore, the second information recording layer 23 has a layer number information part in the inner-radius external part 63.

The pit X 64 is formed so as to have a length in the circumferential direction, i.e., a pit length, longer than that of the recording mark Y (e.g. pit Y), which can be formed in the data region 61 as information different from layer number information, and it therefore can be read by a focusing operation alone by the optical head. Accordingly, the layer number information can be read out more quickly as compared with a conventional optical information recording medium from which layer number information is read out by carrying out a focusing operation and a tracking operation both. As a result, information recording/reproduction with respect to an information recording layer can be started more quickly.

Further, as will be described later, the pit X 64 as the recording mark X is formed at the same time the substrate and the spacer layers are formed. Therefore, an optical information recording medium having layer number information parts can be produced without increasing the number of steps and the costs.

The pit length of the pit X 64 is not particularly limited as long as it can be read by a focusing operation alone, but, for example, the pit X preferably has a pit length of 3 µm to 200 µm in the case where the pit Y formed in the data region 61 has a pit length of 0.05 µm to 2 µm. In the case where the pit length of the pit X is about 1.5 times or more the pit length of the pit Y as described above, the reading of layer number information by a focusing operation alone can be carried out excellently.

The configuration of the first information recording layer 22 is not limited particularly, and may be the same as that of an information recording layer of a conventional optical information recording medium. The configuration may be, for example, such that a reflection film, a first protective film, a recording film, and a second protective film are provided in the stated order from the substrate 21 side. A Ag compound or the like, for example, is used as a material for the reflection film, and ZnS—SiO$_2$ or the like, for example, is used as a material for the first and second protective films. Used as a material for the recording film is, for example, a phase change material whose crystal structure is changed due to heat, more specifically, GeSbTe or the like. Any of these films can be formed by sputtering, vapor deposition, or the like.

Each of the second information recording layer 23, the third information recording layer 24, and the fourth information recording layer 25 has the same structure as that of the first information recording layer 22, and their materials and forming methods are the same as those for the first information recording layer, too.

The material of the substrate 21 is not particularly limited, and polycarbonate, an acryl-based resin, etc. is used, for example. The substrate 21 is formed by, for example, injection molding using a metal die (also referred to as metal stamper). Since the metal stamper has a surface having projections and recesses, on which tracks and pits X corresponding to layer number information parts of the first information recording layer can be formed (this surface is hereinafter referred to as uneven surface), tracks and pits X are formed at the same time when the substrate 21 is formed by injection molding.

The uneven surface of the metal stamper can be formed also by using, for example, a laser beam that is used for forming grooves in a glass original master on which a resist layer is provided.

The first spacer layer 27 contains, for example, an ultraviolet curable resin, and can be formed in the following manner.

A toroidal-shaped UV curable sheet containing an ultraviolet curable resin is caused to adhere onto the first information recording layer 22 formed on the substrate 21. The adhesion is carried out by using a roller paster, for example. Next, a stamper substrate having an uneven surface, on which tracks and pits X corresponding to layer number information parts can be formed, is pressed against the UV curable sheet so that the projections and recesses on the uneven surface are transferred onto the UV curable sheet. Next, the UV curable sheet is irradiated with ultraviolet rays via the stamper substrate. The UV curable sheet is cured, thereby becoming the first spacer layer 27. Thereafter, the stamper substrate is unstuck from the first spacer layer 27. The second spacer layer 28 and the third spacer layer 29 can be formed with the same material by the same method as the material and method for the first spacer layer 27. Adequate thicknesses of the first to third spacer layers 27, 28, and 29 are usually 5 μm to 25 μm.

Though the material for the stamper substrate is not particularly limited, polycarbonate, polyolefin, or the like is used, for example. The stamper substrate is formed by injection molding, for example.

It should be noted that the spacer layer is formed by the following method, too. First, a paint containing a UV curable resin is applied over an information recording layer. Then, a stamper substrate having an uneven surface on which tracks and pits X corresponding to layer number information parts can be formed is caused to adhere to the paint thus applied. Thereafter, the paint is irradiated with ultraviolet rays via the stamper substrate so that the UV curable resin is cured, thereby becoming a spacer layer. Then, the stamper substrate is removed from the spacer layer.

Further, the method for forming pits X corresponding to layer number information parts is not limited to the above-described methods using a metal stamper or a stamper substrate. The pits X may be formed by using, for example, a laser beam having a high laser power of 0.1 W to 5 W.

The light transmission layer 26 can be formed by, for example, spin coating or the like, with use of a ultraviolet curable resin or the like. An adequate thickness of the light transmission layer is normally 30 μm to 60 μm.

In the example shown in FIG. 1, a polycarbonate substrate having a diameter of 120 mm, a diameter of a center hole of 15 mm, and a thickness of about 1.1 mm was used as the substrate 21. The thicknesses of the first to third spacer layers 27, 28, and 29 were set to 20 μm each, and the thickness of the light transmission layer was set to 40 μm.

Figure 3:
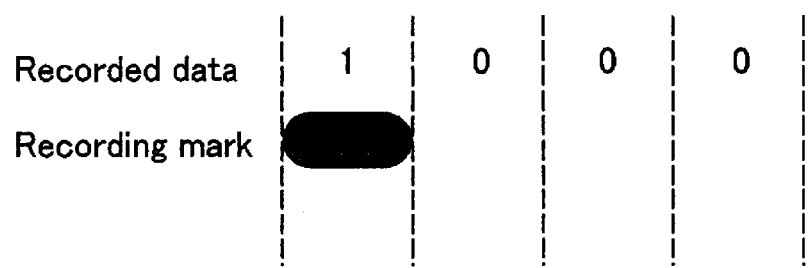
FIG. 3 is a conceptual diagram illustrating a recording mark X corresponding to a layer number information part of a second information recording layer, and data recorded therein.
Figure 4:
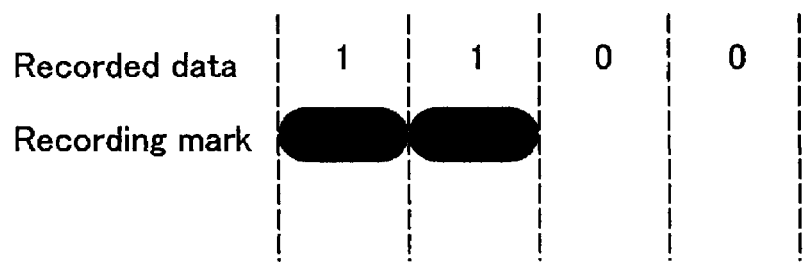
FIG. 4 is a conceptual diagram illustrating a recording mark X corresponding to a layer number information part of a third information recording layer, and data recorded therein.
Figure 5:
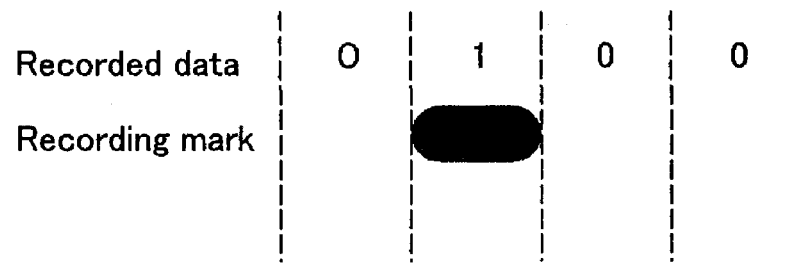
FIG. 5 is a conceptual diagram illustrating a recording mark X corresponding to a layer number information part of a fourth information recording layer, and data recorded therein.

The following more specifically describes the layer number information parts of the optical information recording medium described above with reference to FIGS. 1 and 2, while referring to FIGS. 3 to 5. FIGS. 3, 4, and 5 are conceptual diagrams that illustrate recording marks X corresponding to layer number information parts of the second, third, and fourth information recording layers 23, 24, and 25, respectively, and data recorded therein. In FIGS. 3 to 5, black solid marks represent recording marks X corresponding to the layer number information parts, and "1" and "0" represent data recorded therein.

Pits X or pit X rows as shown in FIGS. 3, 4, and 5 are formed in the L1 surface 27a of the first spacer layer 27, the L2 layer 28a of the second spacer layer 28, and the L3 layer 29a of the third spacer layer 29, respectively. Therefore, recorded data 1-0 are read out of the layer number information part of the second information recording layer 23, recorded data 1-1 are read out of the layer number information part of the third information recording layer, and recorded data 0-1 are read out of the layer number information part of the fourth information recording layer.

It should be noted that the since no recording mark X is formed on the L0 surface 21a of the substrate 21, the first information recording layer 22 does not have layer number information parts. However, since recorded data 0-0 are read out of the first information recording layer 22, the first information recording layer 22 can be distinguished from the other information recording layers. Thus, with the foregoing configuration of an optical information recording medium including n information recording layers, in which not less than (n−1) information recording layers have layer number information parts, respectively, it is possible to determine which information recording layer is irradiated with laser light by the reproduction of layer number information.

In the present example, the pits Y recorded as information different from the layer number information in the information recording layer had a longest pit length of 1.6 μm and a pit width of 2 μm. Therefore, the pit length of the pits X corresponding to the layer number information parts was set to 3 μm and the pit width thereof was set to 0.3 μm.

The reproduction of the layer number information can be carried out by irradiating the layer number information parts of the information recording layers with laser light subjected to focusing control. In the case of a medium including four information recording layers, like the optical information recording medium as shown in FIG. 2, it is possible to determine which information recording layer is irradiated by laser light, with the use of four recorded data patterns of 0-0, 0-1, 1-1, and 1-0.

Figure 6:
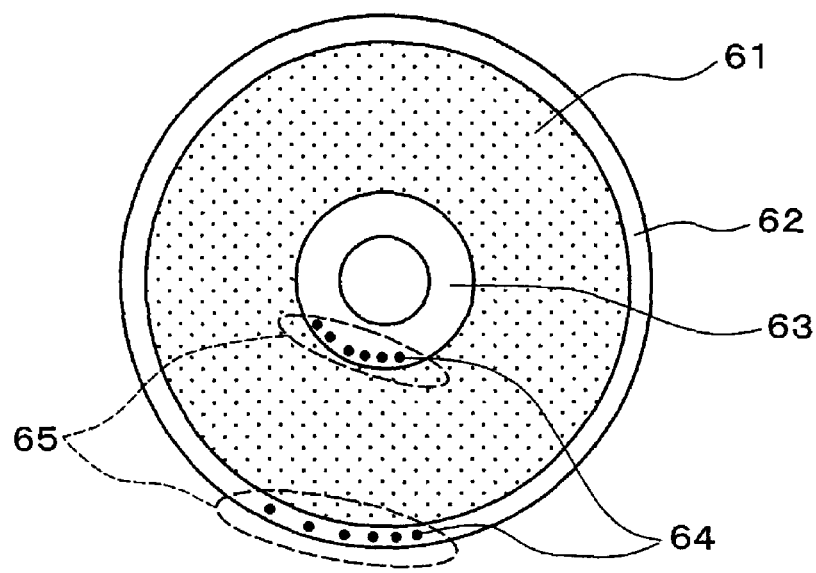
FIG. 6 is a conceptual diagram illustrating another exemplary optical information recording medium according to Embodiment 1.

The following describes another exemplary optical information recording medium according to the present embodiment, while referring to FIG. 6. The present example also includes four information recording layers like an optical information recording medium as shown in FIG. 1.

As shown in FIG. 6, the second information recording layer of the optical information recording medium according to the present embodiment includes layer number information parts formed in correspondence with a plurality of pits X 64 (also referred to as pit X row 65). In the example shown in FIG. 6 also, the second information recording layer is composed of a data region 61 and a non-data region (inner-radius external part 63, outer-radius external part 62). In the present example, the pits X 64 are formed in a region immediately under the inner-radius external part 63, and in a region immediately under the outer-radius external part 62, on the L1 surface 27a of the first spacer layer 27. Therefore, the layer number information parts are present in the inner-radius external region 63 and the outer-radius external region 62.

The layer number information parts of the second information recording layer being present in the data region 61 causes the data recording capacity to decrease, but in contrast, the layer number information parts being present in the non-data region (inner-radius external part 63, outer-radius external part 62), like in the example shown in FIG. 6, makes it possible to provide an optical information recording medium having layer number information parts, without decrease in the data recording capacity.

Figure 7:
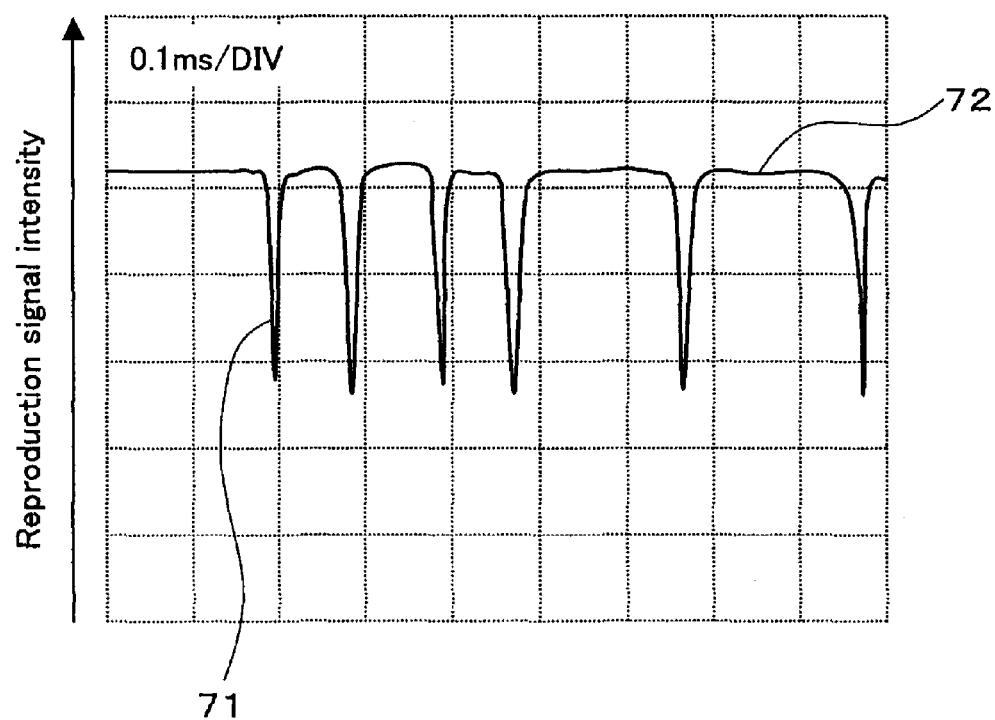
FIG. 7 is a waveform diagram of a reproduction signal obtained by causing a reproduction light subjected to a focusing control to travel over a second information recording layer of the optical information recording medium shown in FIG. 6.

FIG. 7 is a waveform diagram for a reproduction signal obtained by traveling reproduction light focused onto the second information recording layer. The linear velocity of reproduction light was set to 5 m/s, and the laser power was set to 0.3 mW.

In FIG. 7, "71" denotes a reproduction signal waveform for a portion of layer number information parts corresponding to a pit X row 65, and "72" denotes a reproduction signal waveform for a part other than the layer number information parts in the inner-radius external part 63.

Since the reflection light amount decreases in a portion of the layer number information parts formed in correspondence with the pits X 64, the reproduction signal intensity of the foregoing portion is lower than that of the part other than the layer number information parts. Therefore, the layer number information parts are reproduced with a large signal amplitude. Then, the reproduced signal is demodulated, and is determined by an overall controller that will be described later.

Thus, in the case where a layer number information part is provided in one of the inner-radius external part 63 and the outer-radius external part 62 or both of the same, an optical information recording medium having layer number information parts can be provided without a decrease in the data recording capacity.

Figure 8:
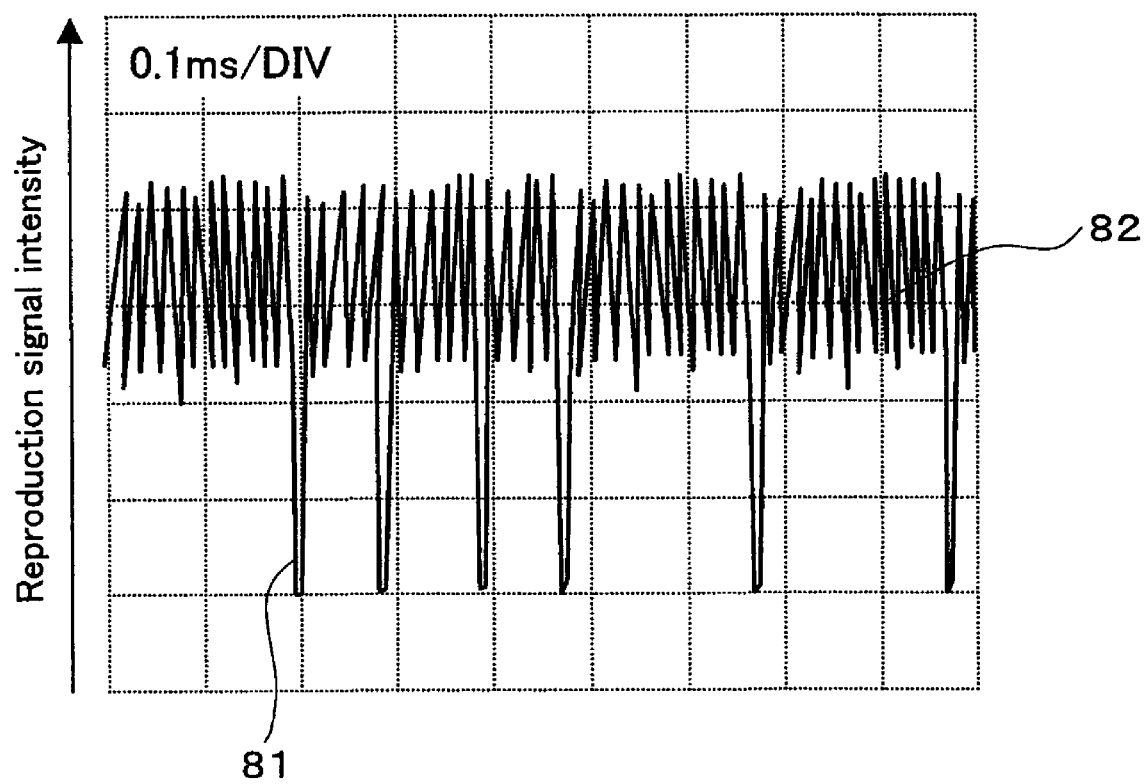
FIG. 8 is a waveform diagram of a reproduction signal obtained by causing a reproduction light subjected to a focusing control to travel over a data region of the second information recording layer of the optical information recording medium shown in FIG. 6.

FIG. 8 is a waveform diagram of a reproduction signal obtained by traveling reproduction light subjected to focusing control on the second information recording layer in the case where the second information recording layer includes layer number information parts corresponding to the pit X row 65 in the data region 61. It should be noted that pits Y are formed as information different from layer number information in the data region 61.

In FIG. 8, "81" denotes a reproduction signal waveform of a portion of layer number information parts corresponding to the pit X row 65, and "82" denotes a reproduction signal waveform of the pits Y.

Like in the case shown in FIG. 7, since the reflection light amount decreases in the pits X 64 composing the pit X row 65, the reproduction signal intensity of the foregoing portion of layer number information parts is lower than that of the part other than the layer number information parts of the second information recording layer. Further, since the length of the pit X 64 in the circumferential direction (laser light traveling direction) is longer than that of the pit Y, the waveform corresponding to the pits X 64, i.e., the waveform corresponding to a portion of the layer number information parts, can be distinguished from the waveform corresponding to the pits Y.

By removing the reproduction signal waveform 82 corresponding to the pits Y from the total reproduction signal waveform by using a low-pass filter, only signal amplitudes of the layer number information parts corresponding to the pit X row can be reproduced as a reproduction signal.

The layer number information parts formed in correspondence with the pit X row 65 may be present only in the data region 61 in the second information recording layer, but alternatively, may be present in the non-data region, or in both of the data region 61 and the non-data regions 62 and 63. In the case where the layer number information formed in correspondence with the pit X row 65 is on a track through which a reproduction light spot travels, the layer number information can be reproduced.

In the case where information is recorded/reproduced by rotating an optical information recording medium at a constant angular velocity, a distance of progress per unit time (linear velocity) is longer at an outer radius than at an inner radius. Therefore, if the number of layer number information parts that are identical to one another is increased relatively in a circle at an outer radius as compared with a circle at an inner radius, the layer number information can be read out more quickly.

The following describes still other exemplary optical information recording media according to the present embodiment, while referring to FIGS. 9 to 14. In these examples, each optical information recording medium includes four information recording layers, like the optical information recording medium shown in FIG. 1.

Figure 9:
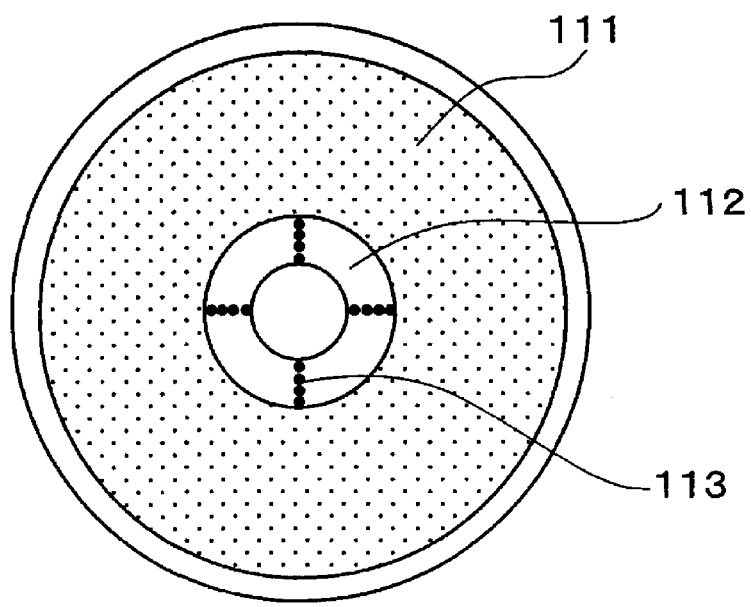
FIG. 9 is a conceptual diagram illustrating still another exemplary optical information recording medium according to Embodiment 1.

In the example shown in FIG. 9, the second information recording layer has layer number information parts that are formed in correspondence with pits 113, respectively. In this example, the layer number information part is present in an inner radius part 112 outside a data region (non-data region) (hereinafter referred to as inner-radius external part 112). The reproduction of the layer number information is carried out by positioning an optical head above a desired region including the layer number information part in the second information recording layer, and irradiating the desired region with laser light subjected to focusing control.

This example is configured so that four layer number information parts that are identical to one another are provided in one circle at a given radius, and four layer number information parts that are identical to one another are provided in a given radial direction. Therefore, irrespective of the position in a given circle at which the irradiation with reproduction light is started, the layer number information of the second information recording layer can be read out when the reproduction light passes over any one of the four layer number information parts in the foregoing circle.

Further, even if there is no layer number information part in the foregoing circle, the optical head may continuously irradiate the rotating optical information recording medium with the reproduction light while being moved in a radial direction, whereby any one of the four layer number information parts formed along a given radial direction can be read.

Thus, with a configuration in which a plurality of layer number information parts that are identical to one another are provided in a radial direction, and a plurality of layer number information parts that are identical to one another are provided in one circle, the layer number information can be read out more quickly and the time elapse until the start of recording/reproduction of information can be shortened.

It should be noted that the number of layer number information parts in one circle is not particularly limited as long as it is more than one, and it may be two, three, five, or more. Spaces between the plural layer number information parts in one circle are not particularly limited, and the layer number information parts may be spaced equally or unequally. The number of layer number information parts provided along in a given radial direction is not particularly limited as long as it is not less than one, and the number may be two, three, five, or more.

Figure 10:
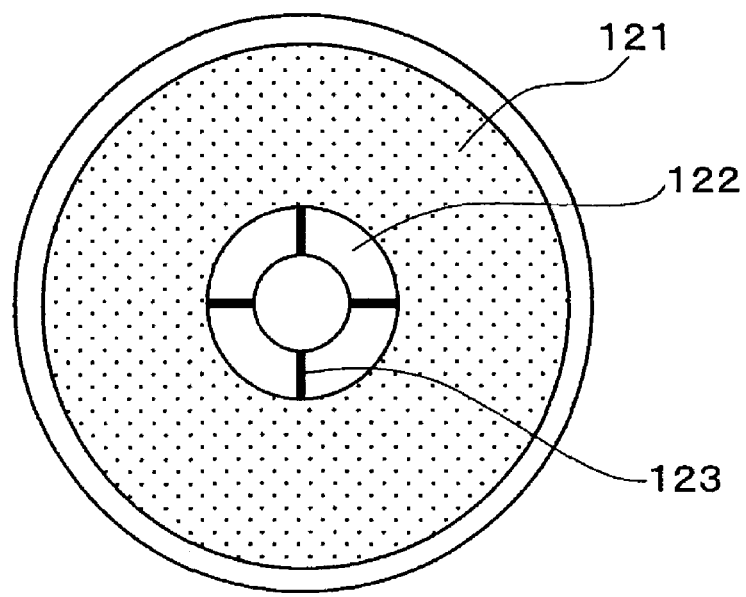
FIG. 10 is a conceptual diagram illustrating still another exemplary optical information recording medium according to Embodiment 1.

In the example shown in FIG. 10, the second information recording layer has layer number information parts that are formed in correspondence with grooves 123, each of which is a single piece, respectively. The grooves 123 are formed so that lengthwise directions thereof are directed in the same directions as the radial directions of the optical information recording medium. Besides, in the present example, the four grooves 123 are formed radially. Therefore, irrespective of the position in a given circle at which the irradiation with reproduction light is started, the layer number information can be read out of the layer number information parts, when the reproduction light passes across any one of the four grooves 123 in the foregoing circle. It should be noted that the number of the grooves 123 is not particularly limited as long as it is not less than one, and it may be two, three, five, or more.

Since the grooves 123 as the recording marks X are formed along radial directions of the optical information recording medium, it can be considered that the grooves 123 function in the same manner as the plural pits X 113 in FIG. 9. Each of the foregoing grooves 123, however, is formed continuously in a radial direction, and therefore, the layer number information can be read out as a signal with higher quality as compared with the case where one set of the plural recording marks is formed in a radial direction as shown in FIG. 9.

Figure 11:
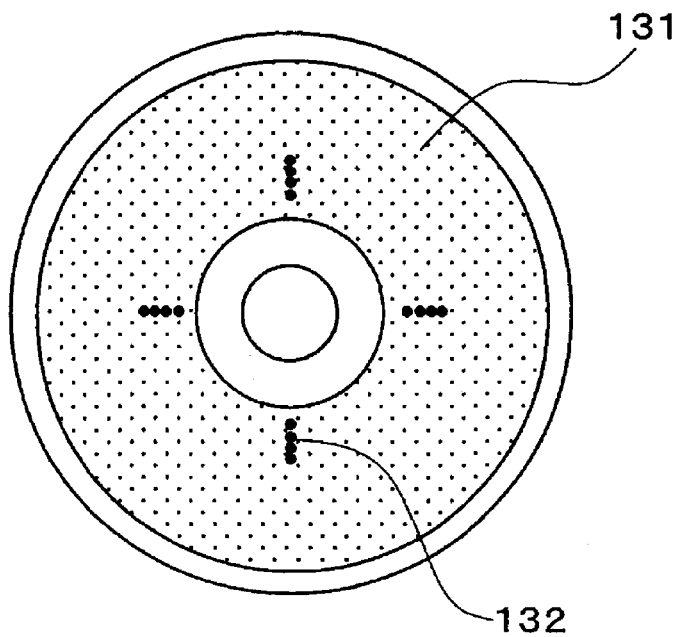
FIG. 11 is a conceptual diagram illustrating still another exemplary optical information recording medium according to Embodiment 1.

In an example shown in FIG. 11, like the example shown in FIG. 9, the second information recording layer has layer number information parts that are formed in correspondence with pits 132, respectively. However, in the present example, all of the pits 132 are formed in a region on a L1 surface of the first spacer layer, in a region immediately under a data region 131 of the second information recording layer, and the layer number information parts are present in the data region 131 of the second information recording layer.

Figure 12:
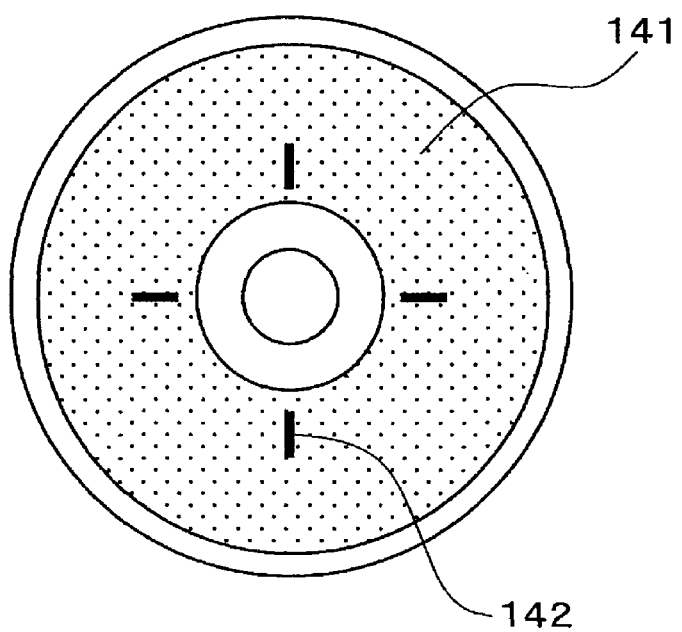
FIG. 12 is a conceptual diagram illustrating still another exemplary optical information recording medium according to Embodiment 1.

In an example shown in FIG. 12, like the example shown in FIG. 10, the second information recording layer has layer number information parts that are formed in correspondence with grooves 142, each of which is a single piece, respectively. In the present example, however, all the grooves 142 are formed in a region on a L1 surface of the first spacer layer, immediately under a data region 141 of the second information recording layer, and the layer number information parts are present in the data region 141. In the case where the recording marks X are thus composed of the foregoing grooves 142, a groove width thereof is sufficiently longer than a length in the circumferential direction of a recording mark Y formed in the data region 141, and preferably is not less than 1.5 times the length in the circumferential direction of the recording mark Y.

Figure 13:
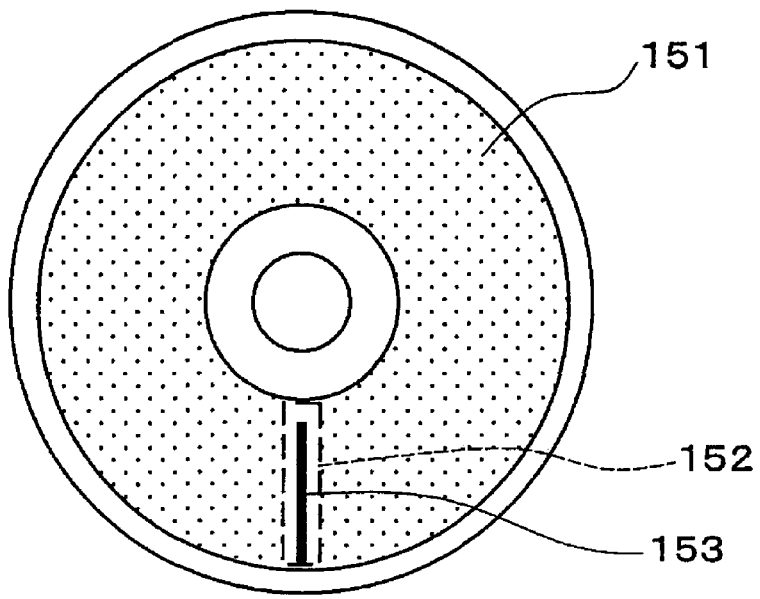
FIG. 13 is a conceptual diagram illustrating still another exemplary optical information recording medium according to Embodiment 1.

In an example shown in FIG. 13, a mirror surface part 152 inside the data region (hereinafter referred to as "internal mirror surface part 152") is provided in a data region 151, and a layer number information part formed in correspondence with a groove 153 that is a single piece is present in the internal mirror surface parts 152. The internal mirror surface part 152 preferably has an area that is set so that a decrease in data recording capacity caused by the internal mirror surface part 152 thus formed is minimized. In the case where the layer number information part is present in the internal mirror surface part 152, the reproduction quality of layer number information is enhanced.

Figure 14:
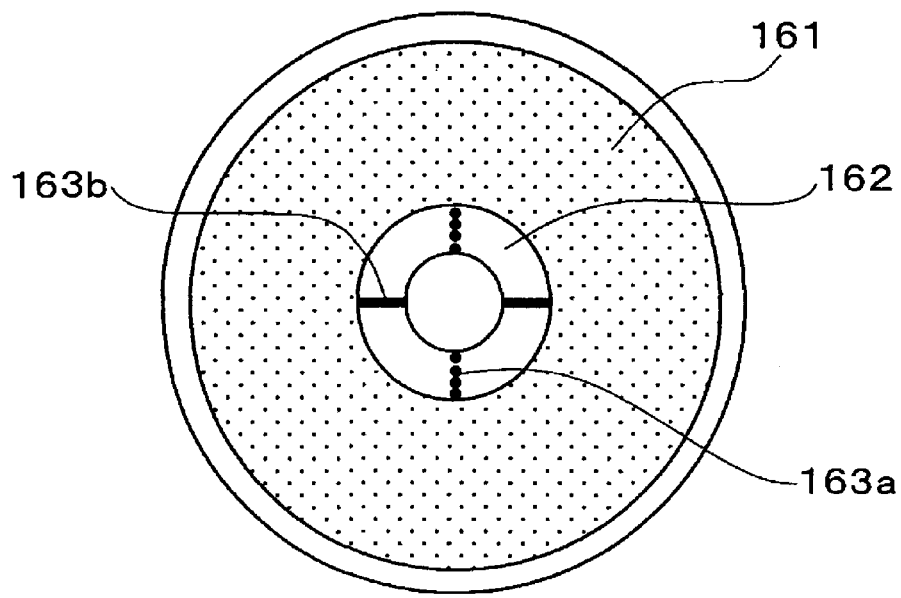
FIG. 14 is a conceptual diagram illustrating still another exemplary optical information recording medium according to Embodiment 1.

In an example shown in FIG. 14, the second information recording layer has layer number information parts in two different forms. The layer number information parts in one of the two forms are layer number information parts formed in correspondence with pits 163a, respectively, while those in the other form are layer number information parts formed in correspondence with grooves 163b. In the present example, the layer number information parts in both of the forms are present in inner-radius external parts 162, outside the data region 161.

In any of the examples of FIGS. 9 to 14, one or more recording marks that are formed in correspondence with one layer number information part are formed with only a groove(s) or a pit(s), but the optical information recording medium according to the present embodiment is not limited to this configuration. One layer number information part may be formed in correspondence with one or more grooves and one or more pits. Alternatively, the form of a layer number information part formed in correspondence with one or more recording marks X in one information recording layer may be different from that in another information recording layer. In the examples shown in FIGS. 9 and 11, a plurality of layer number information parts that are identical to one another are provided along a given radial direction, but they do not have to be present in the radial direction. One of the same may be deviated in a circumferential direction.

By referring to the examples shown in FIGS. 9 to 14, the layer number information parts of the second information recording layer are described. The other information recording layers also have layer number information parts in the same manner. The number of the information recording layers is not limited to four as long as it is plural. Further, at least two information recording layers selected from n information recording layers may be different from each other regarding at least one of the number of layer number information parts, the positions where the layer number information parts are provided, and the form of the layer number information parts.

Embodiment 2

Figure 15:
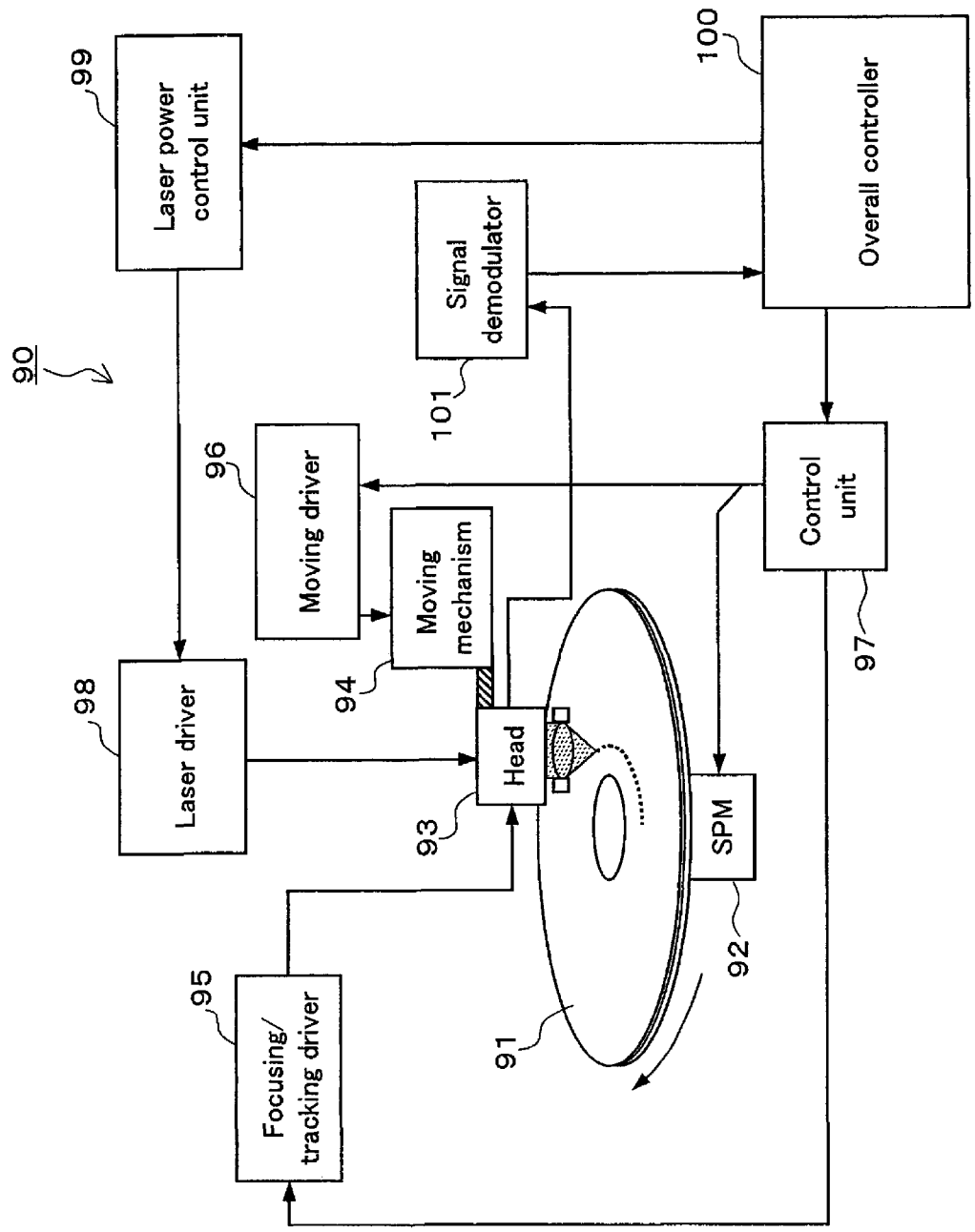
FIG. 15 illustrates a configuration of an exemplary information recording/reproducing device according to Embodiment 2.
Figure 16:
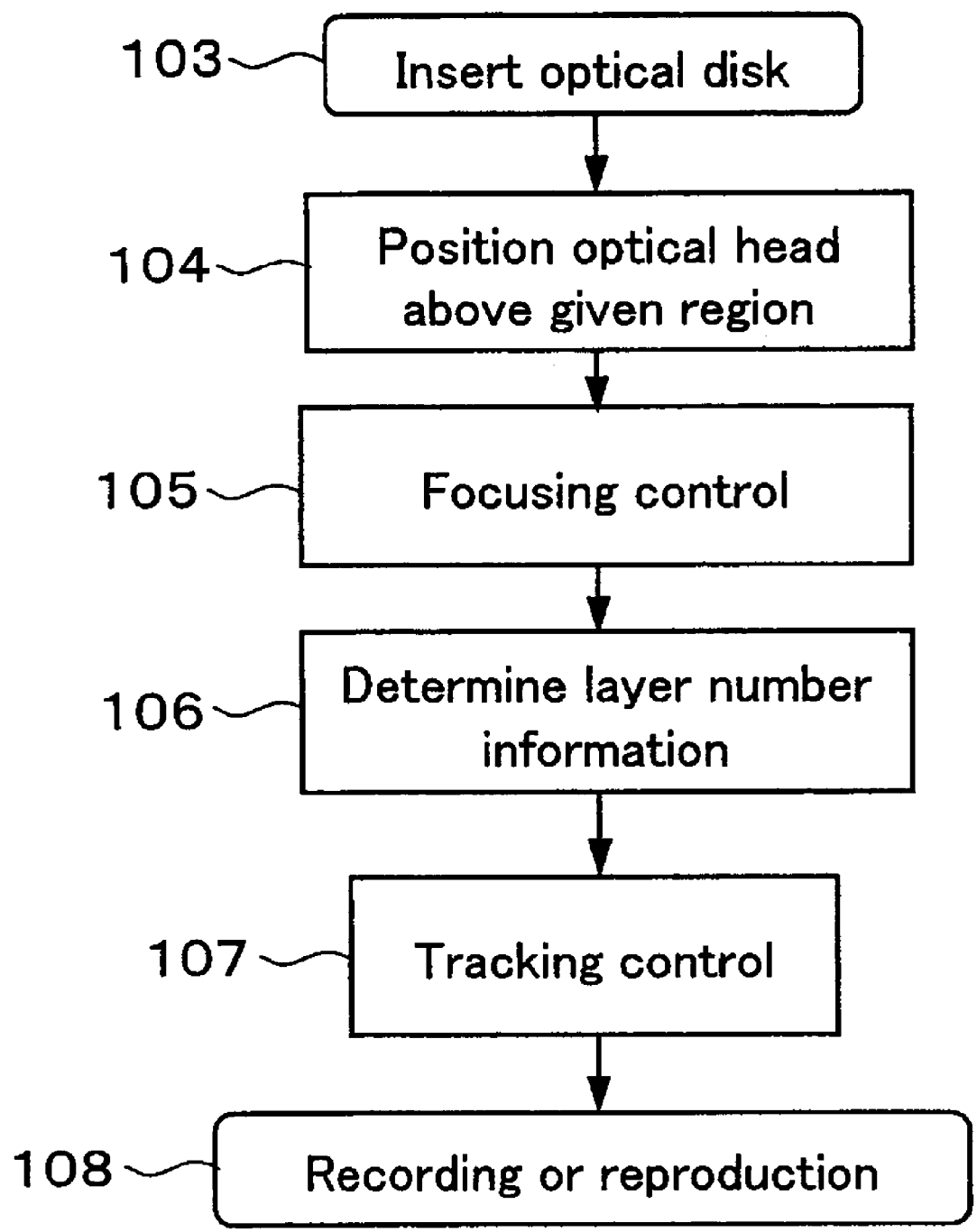
FIG. 16 is a flowchart explaining an information recording/reproducing method using the information recording/reproducing device shown in FIG. 15.
Figure 17:
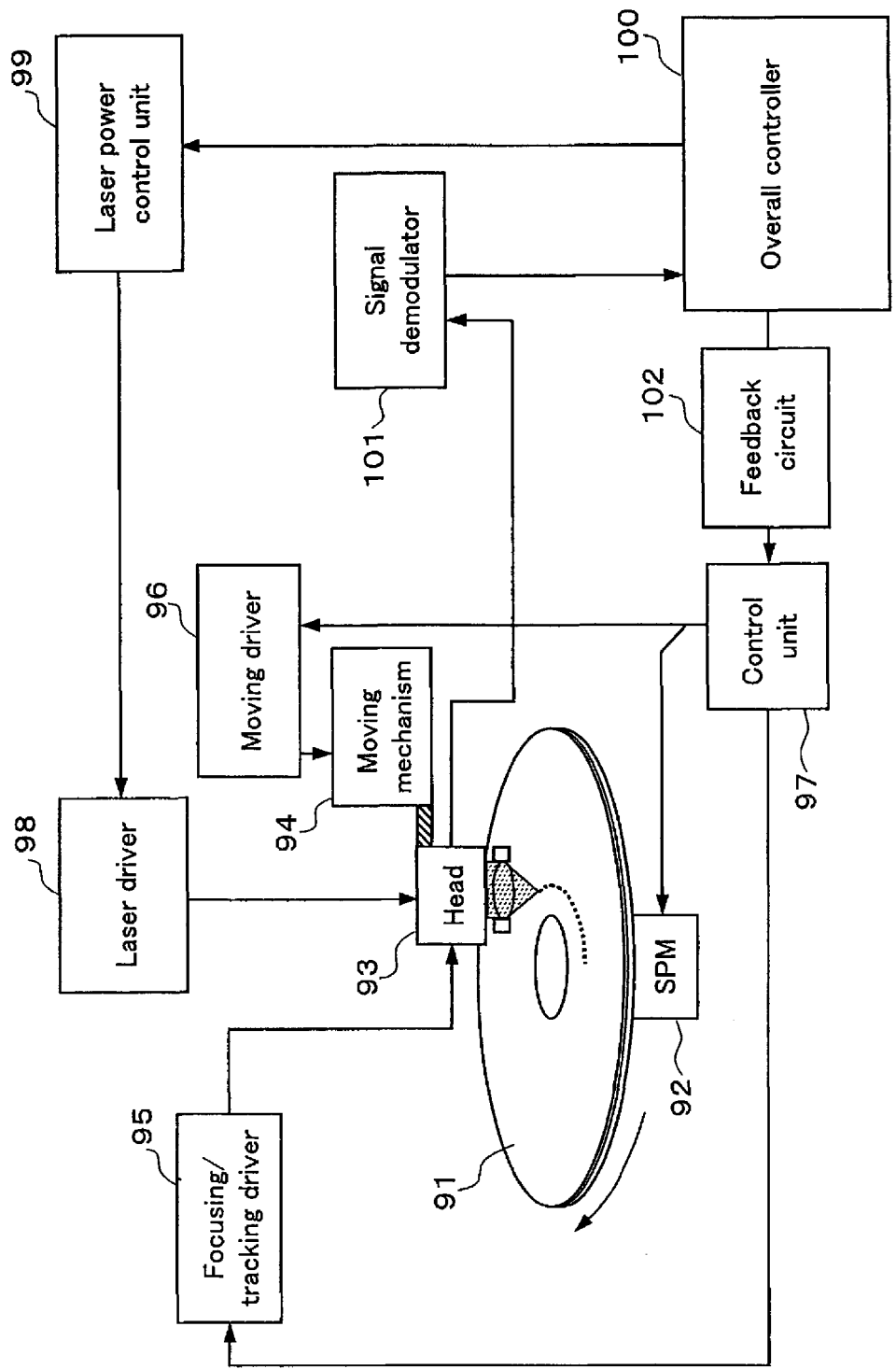
FIG. 17 illustrates a configuration of another exemplary information recording/reproducing device according to Embodiment 2.
Figure 18:
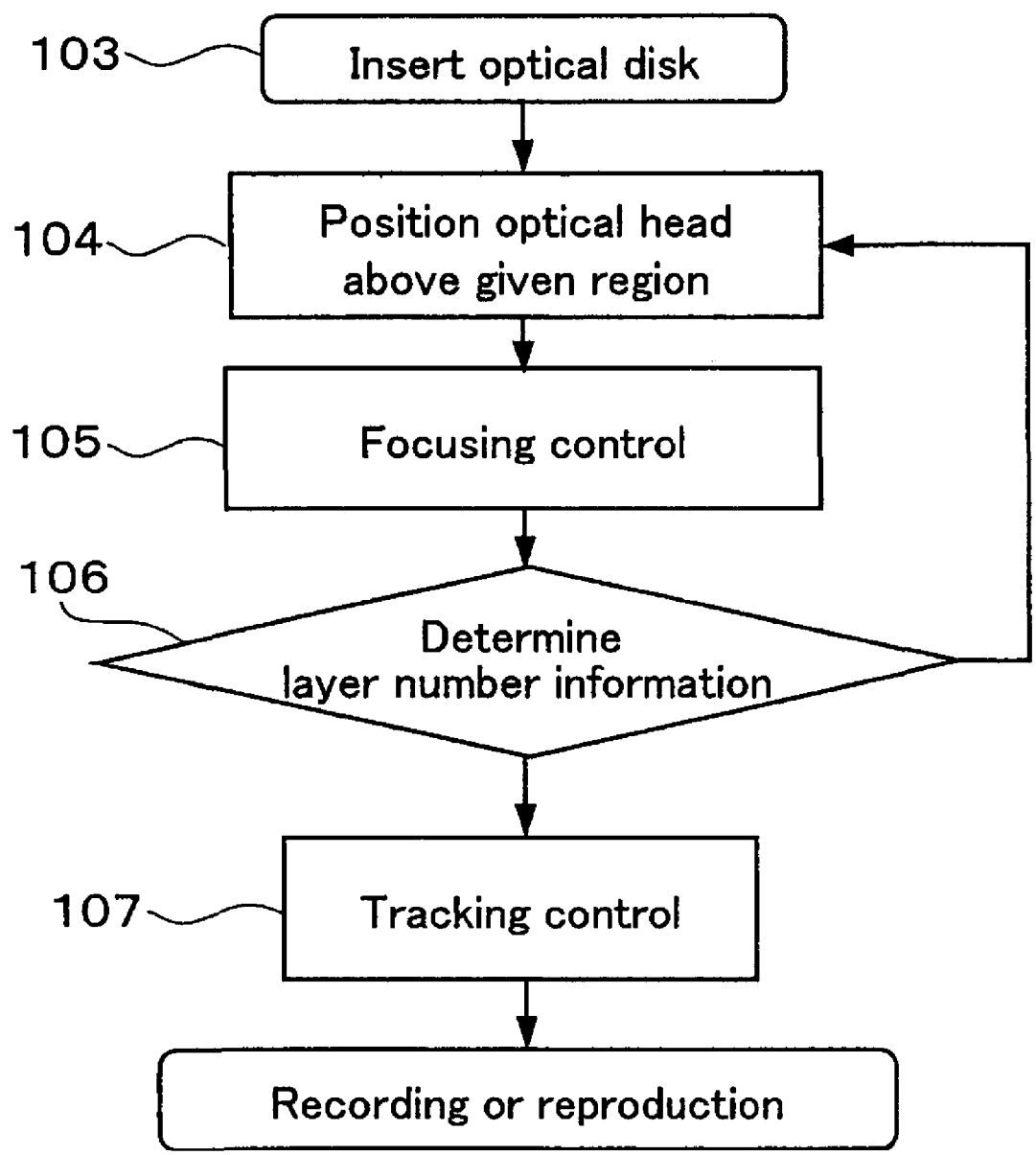
FIG. 18 is a flowchart explaining an information recording/reproducing method using the information recording/reproducing device shown in FIG. 17.
Figure 19:
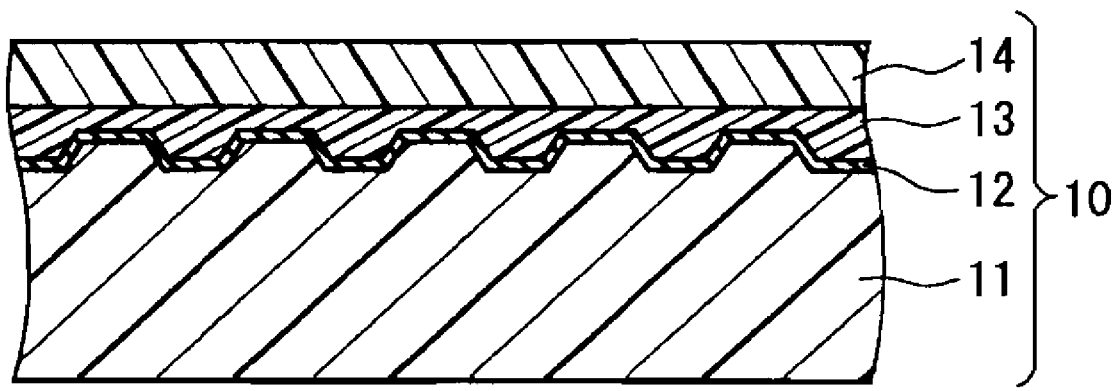
FIG. 19 is a cross-sectional view of a data region of an exemplary conventional optical information recording medium.

Exemplary information recording/reproducing devices of the present invention and exemplary information recording/reproducing methods are described in Embodiment 2. FIG. 15 illustrates a configuration of an exemplary information recording/reproducing device according to the present embodiment, and FIG. 16 is a flowchart explaining an information recording/reproducing method using the information recording/reproducing device shown in FIG. 15. FIG. 17 illustrates a configuration of another exemplary information recording/reproducing device according to the present embodiment, and FIG. 18 is a flowchart explaining an information recording/reproducing method using the information recording/reproducing device shown in FIG. 17.

As shown in FIG. 15, an information recording/reproducing device 90 according to the present embodiment includes a motor 92 for rotating an optical information recording medium 91 and an optical head 93. The optical head 93 includes a light source for emitting laser light, a focusing unit, and a tracking unit, and is capable of reading layer number information out of layer number information parts of a given information recording layer of the optical information recording medium 91.

Further, the information recording/reproducing device 90 includes: a moving mechanism 94 that is capable of moving the optical head 93 in a radial direction of the optical information recording medium; a moving driver 96 for driving the moving mechanism 94; a focusing/tracking driver 95 for driving the focusing unit and the tracking unit of the optical head 93; a control unit 97 for controlling the focusing/tracking driver 95, the moving driver 96, and the rotation motor 92; a laser driver 98 for modulating laser power of the optical head 93 for reproduction of layer number information; a laser power control unit 99 for carrying out power control of the laser driver 98; a signal demodulator 101 for demodulating layer number information read out by the optical head 93; and an overall controller 100 for controlling the control unit 97 and the laser power control unit 99.

As the optical head 93, an optical head that includes, for example, an objective lens having a numerical aperture (NA) of 0.85, and a light source that is capable of emitting laser light with a wavelength of 405 nm.

The information recording/reproducing device shown in FIG. 17 has the same configuration as the information recording/reproducing device shown in FIG. 15 except that a feedback circuit 102 is provided therein additionally. The feedback circuit 102 has a function of controlling the focusing unit based on a result of the determination of the layer number information by the overall controller 100 so as to read layer number information of an information recording layer different from a given information recording layer.

The following describes an information recording/reproducing method using the information recording/reproducing device shown in FIG. 15, while referring to FIGS. 15 and 16.

In the information recording/reproducing method according to the present embodiment, the layer number information is determined by referring to layer number information parts in a given information recording layer of an optical information recording medium, and thereafter, information is recorded and/or reproduced from the foregoing given information recording layer.

More specifically, as shown in FIGS. 15 and 16, an optical information recording medium is inserted into the information recording/reproducing device 90, and the optical information recording medium is rotated by the rotation motor 92 (Step 103).

Next, the optical head 93 is moved in a radial direction by the moving mechanism 94 so that the optical head 93 is positioned above a given region including layer number information parts on a principal surface on one side of a give information recording layer (Step 104). Thereafter, the optical information recording medium 91 is irradiated with reproduction laser light having a desired laser power by the overall controller 100 via the laser power control unit 99, the laser driver 98, and the optical head 93. In synchronization with this operation, a focusing control is carried out by the focusing/tracking driver 95 (Step 105).

Then, layer number information is read out by the optical head 93, the layer number information thus read is demodulated by the signal demodulator 101, and the layer number information thus demodulated is determined by the overall controller 100 (Step 106).

When the layer number information is determined by the overall controller 100 to be the layer number information of the desired information recording layer, a tracking control operation is carried out with respect to the foregoing information recording layer (Step 107), and thereafter the recording or reproduction is carried out with respect to the foregoing information recording layer (Step 108).

The following describes an information recording/reproducing method using the information recording/reproducing device shown in FIG. 17, while referring to FIGS. 17 and 18.

When the information recording/reproducing device 90 is subjected to a significant impact or a disk has a defect or the like, the focusing/tracking control does not take effect in some cases. In such a case, only a signal for driving the focusing unit of the optical head 93 is transmitted from the overall controller 100 to the focusing/tracking driver 95 via the control unit 97. A reproduction signal of the layer number information read out by the optical head 93 is demodulated by the signal demodulator 101, and it is checked to which information recording layer the layer number information thus read belongs, by the determination by the overall controller 100 (Step 106). Then, either one of the following operations (a) and (b) is carried out according to the result of the determination by the overall controller 100.

(a) In the case where the layer number information thus demodulated is determined not to be the layer number information of the desired information recording layer, the positioning of the optical head above the given region (Step 104), the irradiation of the laser light subjected to focusing control (Step 105), and the determination of the layer number information (Step 106) are carried out with respect to an information recording layer different from the foregoing information recording layer, and this series of steps is repeated until layer number information of a desired information recording layer is obtained. After the layer number information of the desired layer number information is obtained, tracking control is carried out with respect to the information recording layer.

(b) In the case where the demodulated layer number information is determined to be layer number information of the desired information recording layer, tracking control is carried out with respect to the information recording layer.

Such feedback control by the feedback circuit 102 is not essential. In the case where the number of information recording layers included in an optical information recording medium is large, however, the foregoing feedback control works very effectively so as to reduce the time elapse until the start of information recording/reproduction to/from a desired information recording layer.

It should be noted that, in an information recording/reproducing device, the reproduction of layer number information preferably is carried out with the same laser power as that for reproducing recording marks Y recorded in a data region. Further, when layer number information is reproduced again during an operation of recording the recording marks Y, the reproducing operation preferably is carried out with the same laser power as that of reproduction light for reproducing the recording marks Y recorded in the data region. This is because if the reproduction of layer number information is carried out with use of recording light subjected to focusing control, there is a possibility that information recorded in the data region would be erased by mistake.

The optical information recording medium according to Embodiment 1 is a phase-change-type optical information recording medium, but the optical information recording medium of the present invention is not limited to the foregoing type. The optical information recording medium of the present invention may be a so-called read-only type in which, for example, recording marks X are recorded as pits X and an information recording layer is composed of a reflection film containing, for example, Ag, AL, or Si as a principal component. Alternatively, the optical information recording medium of the present invention may be a write-once type.

As described so far, the present invention has been described by referring to examples, but the present invention is not limited to the above-described embodiments. The present invention may be applicable in other embodiments based on the technical idea of the present invention.

INDUSTRIAL APPLICABILITY

The present invention makes it possible to read layer number information more quickly. Therefore, the present invention makes it possible to provide an optical information recording medium configured so that an information recording/reproducing operation with respect to a desired information recording layer can be started more quickly, as well as to provide a method and a device for recording/reproducing information to/from the foregoing optical information recording medium. The present invention is particularly useful for an optical information recording medium including a larger number of information recording layers.

The invention claimed is

1. An optical information recording medium comprising:
   a substrate;
   n information recording layers provided on the substrate; and
   spacer layers, each of which is provided so as to be interposed between the information recording layers,
   wherein each of (n−1) or more of the information recording layers has a layer number information part containing layer number information, the layer number information part being formed in correspondence with one or more recording marks X, where n represents an integer of not less than 2, and the layer number information is information used for determining which a given information recording layer is among the n information recording layers,
   the one or more recording marks X includes at least either a groove or a pit,
   each recording mark X has a length in a circumferential direction longer than a length in a circumferential direction of a recording mark Y used for recording another information in the information recording layers, and
   each of the recording marks X is formed with the groove whose lengthwise direction extends in the same direction as a radial direction of the optical information recording medium.

2. The optical information recording medium according to claim 1, wherein the recording mark X is formed on the substrate or the spacer layers to which the information recording layers are adjacent, respectively.

3. The optical information recording medium according to claim 1, wherein at least one of the n information recording layers includes a plurality of the layer number information parts that are identical to one another, the plurality of layer number information parts being arranged radially.

4. An optical information recording medium comprising:
   a substrate;
   n information recording layers provided on the substrate; and
   spacer layers, each of which is provided so as to be interposed between the information recording layers,
   wherein each of (n−1) or more of the information recording layers has a layer number information part containing layer number information, the layer number information part being formed in correspondence with one or more recording marks X, where n represents an integer of not less than 2, and the layer number information is information used for determining which a given information recording layer is among the n information recording layers,
   the one or more recording marks X includes at least either a groove or a pit,
   each recording mark X has a length in a circumferential direction longer than a length in a circumferential direction of a recording mark Y used for recording another information in the information recording layers, and
   at least one of the n information recording layers includes, in a circle at a given radius, a plurality of the layer number information parts that are identical to one another.

5. An optical information recording medium comprising:
   a substrate;
   n information recording layers provided on the substrate; and
   spacer layers, each of which is provided so as to be interposed between the information recording layers,
   wherein each of (n−1) or more of the information recording layers has a layer number information part containing layer number information, the layer number information part being formed in correspondence with one or more recording marks X, where n represents an integer of not less than 2, and the layer number information is information used for determining which a given information recording layer is among the n information recording layers,
   the one or more recording marks X includes at least either a groove or a pit,
   each recording mark X has a length in a circumferential direction longer than a length in a circumferential direction of a recording mark Y used for recording another information in the information recording layers, and
   at least one of the n information recording layers includes at least one of layer number information parts in each of two or more circles having the same center and different radii.

6. The optical information recording medium according to claim 5, wherein relatively more layer number information parts are provided in a circle at an outer radius than in a circle at an inner radius.

* * * * *